United States Patent [19]

Talmy et al.

[11] Patent Number: 4,910,172

[45] Date of Patent: Mar. 20, 1990

[54] PREPARATION OF MULLITE WHISKERS FROM ALF$_3$, SIO$_2$, AND AL$_2$O$_3$ POWDERS

[75] Inventors: Inna G. Talmy, Silver Spring, Md.; Deborah A. Haught, Reston, Va.

[73] Assignee: The United States of America as represented by the Secretary of the Navy, Washington, D.C.

[21] Appl. No.: 307,726

[22] Filed: Feb. 8, 1989

[51] Int. Cl.$^4$ .............................................. C04B 35/18
[52] U.S. Cl. ....................................... 501/95; 501/86; 501/127; 501/128; 501/153; 501/154; 423/326; 423/328
[58] Field of Search ................. 501/95, 127, 128, 153, 501/154, 86; 423/326, 328

[56] References Cited

U.S. PATENT DOCUMENTS 2,195,949  9/1936  Wood .................................. 501/128

FOREIGN PATENT DOCUMENTS 857341  12/1970  Canada ................................ 501/153

OTHER PUBLICATIONS

Locsei, "Mullite Formation in the Aluminum Fluoride-Silica System", Nature #4779, 3 Jun. 1961.

Primary Examiner—William R. Dixon, Jr.
Assistant Examiner—Melissa Bonner
Attorney, Agent, or Firm—Kenneth E. Walden; Roger D. Johnson

[57] ABSTRACT

A process for preparing mullite whiskers by
(1) forming an anhydrous, intimate, uniform mixture of AlF$_3$, Al$_2$O$_3$, and fused SiO$_2$ powders in an amount selected to produce stoichiometric mullite or a solid solution of Al$_2$O$_3$ in stoichiometric mullite;
(2) heating the mixture in anhydrous SiF$_4$ atmosphere at a temperature of from about 700° to about 950° C. to form barlike topaz crystals;
(3) heating the barlike topaz in an anhydrous SiF$_4$ atmosphere a a temperature of from about 1150° C. to about 1700° C. to produce the mullite whiskers.

12 Claims, 2 Drawing Sheets

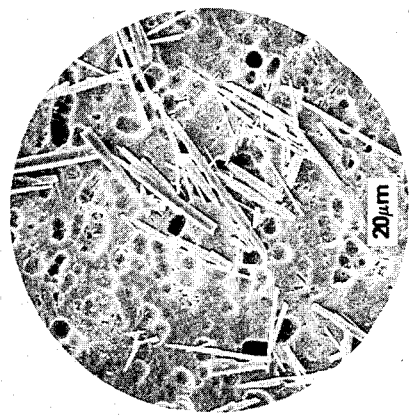
FIG. 1A 0% Al₂O₃
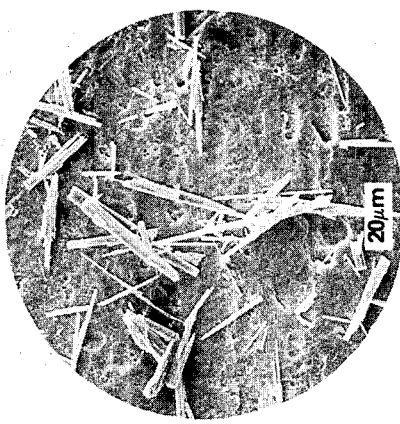
FIG. 1B 25% Al₂O₃
FIG. 1C 50% Al₂O₃
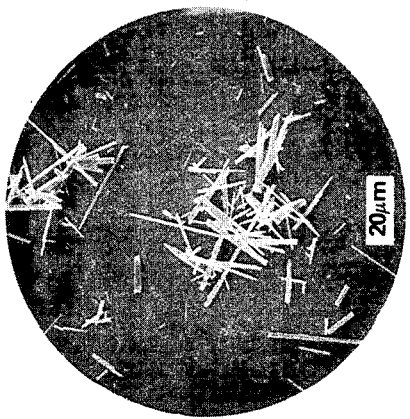
FIG. 1D 75% Al₂O₃

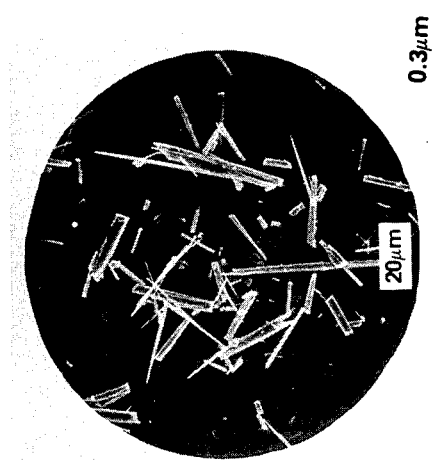
FIG. 2B 0.3μm
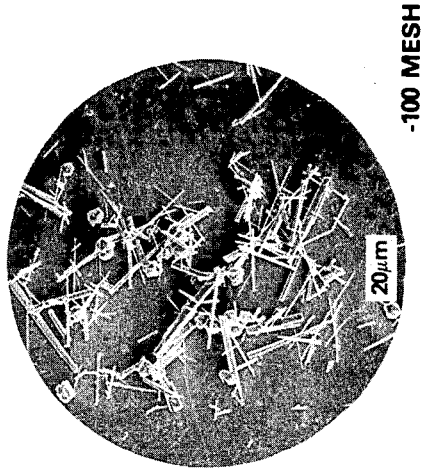
FIG. 2D -100 MESH
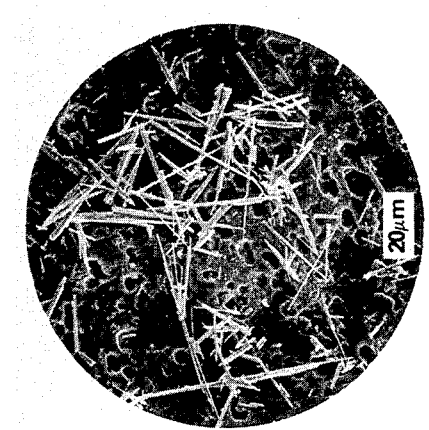
FIG. 2A 0.05μm
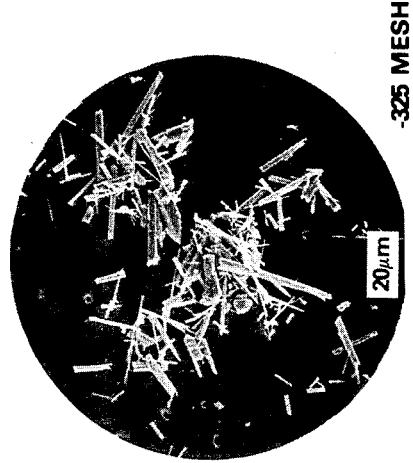
FIG. 2C -325 MESH

PREPARATION OF MULLITE WHISKERS FROM ALF₃, SIO₂, AND AL₂O₃ POWDERS

BACKGROUND OF THE INVENTION

This invention relates to mullite and more particularly to the preparation of mullite whiskers.

Various methods have been used to produce mullite whiskers. U.S. Pat. No. 3,104,943, entitled "Spinnable Mullite Fibers and Their Preparation," which issued to Kenneth L. Berryoon Sept. 24, 1963, discloses a method whereby mullite fibers are crystallized from a vapor phase derived from heating sources of Si, Al, $O_2$, and S in an atmosphere containing at least 1 percent $H_2$ at 800°–1200° C.

U.S. Pat. No. 3,607,025 entitled "Silica-Deficient Mullite Fiber And A Process For Its Production," which issued to Howard W. Jacobson on Sept. 21, 1971, discloses a process whereby an alkali halide and $AlCl_3$ are contacted with a silica source in the presence of an oxidizing gas at 1000°–1350° C. The fibers produced, however, are not stoichiometric mullite (72.8% $Al_2O_3$ and 28.2% $SiO_2$) by composition but do exhibit the x-ray pattern of compositional mullite. The fibers are silica deficient containing 82–99 percent by weight $Al_2O_3$ and the remainder $SiO_2$. Also in the process, the fibers must be leached out from a solidified melt with water or dilute acid solution.

U.S. Pat. No. 3,073,770, entitled "Mullite Synthesis," which issued to William R. Sinclair and John C. Williams on Jan. 15, 1963, discloses a process whereby a reaction sputtered film of $Al_2O_3$ and $SiO_2$ is heated to at least 1000° C. to form mullite whiskers.

Bella Locsei in "Mullite Formation in the Aluminum Fluoride-Silica System ($AlF_3$-$SiO_2$)," Nature, No. 4779, June 3, 1961, discloses that mullite can be formed from reagent grade aluminum fluoride ($AlF_3$) with or without structural water and silica gel or silica glass by heat treatment in an oxidizing atmosphere.

Our (Inna G. Talmy and Deborah A. Haught) copending application entitled, "Mullite Whisker Preparation," U.S. patent application Ser. No. 07/070,757, filed on July 6, 1987, discloses a method of preparing mullite whiskers from $AlF_3$ and $SiO_2$ powders. First, an intimate, anhydrous mixture of $AlF_3$ and $SiO_2$ powders is heated in an anhydrous $SiF_4$ atmosphere at a temperature of from about 700° C. to 950° C. to form barlike topaz crystals. Next, the barlike topaz is heated in an anhydrous $SiF_4$ atmosphere at a temperature of from about 1150° C. to about 1700° C. to produce the mullite whiskers. The $AlF_3$ starting material is expensive and it would be desirable to replace it with a less expensive material as a source of $Al_2O_3$ in mullite.

SUMMARY OF THE INVENTION

Accordingly, an object of this invention is to provide a new method of producing mullite whiskers.

Another object of this invention is to provide a less expensive method of producing mullite whiskers.

A further object of this invention is to provide a method of producing mullite whiskers in selected sizes.

These and other objects of this invention are accomplished by providing a method of producing mullite whiskers by:

(1) forming a uniform mixture of $AlF_3$, $Al_2O_3$, and $SiO_2$ powders in an amount selected to produce stoichiometric mullite or a solid solution of $Al_2O_3$ in stoichiometric mullite;

(2) heating the mixture in an anhydrous $SiF_4$ atmosphere at a temperature of from about 700° C. to about 950° C. to form barlike topaz crystals; and (3) heating the barlike topaz crystals in an anhydrous $SiF_4$ atmosphere at a temperature of from about 1150° C. to about 1700° C. to produce mullite whiskers.

BRIEF DESCRIPTION OF THE FIGURES

A more complete appreciation of the invention and many of its attendant advantages thereof will be readily appreciated as the same becomes better understood by reference to the following detailed description when considered in connection with the accompanying scanning election microscope (SEM) pictures wherein:

FIGS. 1A, 1B, 1C, and 1D illustrate the mullite whiskers produced when (A) 0, (B) 25, (C) 50, and (D) 75 mole percent of the $Al_2O_3$ is furnished by $Al_2O_3$ in the starting mixture; and FIGS. 2A, 2B, 2C, and 2D illustrate the mullite whiskers produced when the $Al_2O_3$ starting material has a particle size of (A) 0.05 microns, (B) 0.3 microns, (C) 45 microns and less, and (D) 150 microns an less.

DETAILED DESCRIPTION OF THE PREFERRED EMBODIMENT

The present process comprises two steps: (1) the conversion of aluminum fluoride ($AlF_3$), alumina ($Al_2O_3$), and fused silica ($SiO_2$) powders into barlike topaz crystals and (2) the subsequent conversion of the barlike topaz crystals into needlelike, single crystal mullite ($3Al_2O_3.2SiO_2$) whiskers. It is critical for the formation of barlike topaz crystals and the subsequent formation of mullite whiskers that both of these steps are performed under anhydrous conditions in a silicon fluoride ($SiF_4$) atmosphere. Anhydrous conditions include the absence of structural water in the $AlF_3$, $Al_2O_3$, and $SiO_2$ starting materials.

In the first step, a uniform mixture of loose $AlF_3$, $Al_2O_3$, and $SiO_2$ powders is heated at a temperature of from about 700° C. to about 950° C. in an anhydrous, approximately 100 percent $SiF_4$ atmosphere to produce barlike topaz crystals. The barlike topaz is produced according to the following reaction:

$$2\ AlF_3 + 2\ SiO_2 \longrightarrow \underset{\text{topaz}}{Al_2(SiO_4)F_2} + SiF_4. \tag{1}$$

During this first step, it appears that the $SiF_4$ generated reacts with the $Al_2O_3$ powder to produce $AlF_3$ and $SiO_2$ according to the following reaction:

$$3SiF_4 + 2Al_2O_3 \rightarrow 4AlF_3 + 3SiO_2. \tag{2}$$

Reactions (1) and (2) proceed simultaneously until the $AlF_3$, $Al_2O_3$, and $SiO_2$ powders are converted to barlike topaz crystals.

The second step of the process comprises the decomposition of the barlike topaz crystals in an anhydrous, approximately 100 percent $SiF_4$ atmosphere at a temperature of from about 1150° C. to about 1700° C. to form mullite whiskers according to the following reaction:

$$6Al_2(SiO_4)F_2 + SiO_2 \rightarrow 2(3Al_2O_3.2SiO_2) + 3SiF_4. \tag{3}$$

From more than zero to 75 percent of the $Al_2O_3$ in the mullite product is supplied by the $Al_2O_3$ powder with the remainder (from less than 100 to 25 percent) being supplied by the $AlF_3$ powder. When more than 50 (up to 75) percent of the $Al_2O_3$ is supplied as $Al_2O_3$, some unreacted $Al_2O_3$ and $SiO_2$ may be present with the barlike topaz crystals after the first (topaz forming) step of the process. However, at the higher (1150°–1700° C.) temperatures of the second step, the $Al_2O_3$ and $SiO_2$ are converted along with the barlike topaz crystals to form mullite whiskers.

At least 25 percent of the $Al_2O_3$ in the mullite product must be supplied as $AlF_3$ for the process to work. In other words, not more than 75 percent of the $Al_2O_3$ can be supplied as $Al_2O_3$ in the starting mixtures. Tests have shown that 75% $Al_2O_3$-25% $AlF_3$ will produce the desired mullite whiskers, whereas 80% $Al_2O_3$-20% $AlF_3$ and 85% $Al_2O_3$-15% $AlF_3$ mixtures form products comprising some mullite whiskers with high amounts of unreacted $Al_2O_3$ and $SiO_2$ as cristobalite.

FIGS. 1A, 1B, 1C, and 1D show the mullite whiskers produced when (A) 0, (B) 25, (C) 50, and (D) 75 percent of the $AlF_3$ is replaced with $Al_2O_3$ in the starting mixtures. The size of the mullite whiskers gradually decreases with increasing $Al_2O_3$ substitution. So, the claimed process allows the tailoring of the mullite whisker size by varying the starting mixture composition.

Table 1 presents the stoichiometric amounts of starting materials required to produce one mole of mullite whiskers as a function of the percent of $Al_2O_3$ in the mullite supplied by $Al_2O_3$ and $AlF_3$ in the starting mixture.

TABLE 1

| % $Al_2O_3$ from | | Moles per mole of stoichiometric mullite | | |
|---|---|---|---|---|
| $Al_2O_3$ | $AlF_3$ | $Al_2O_3$ | $AlF_3$ | $SiO_2$ |
| 0 | 100 | 0 | 6.000 | 6.500 |
| 25 | 75 | 0.750 | 4.500 | 5.375 |
| 50 | 50 | 1.500 | 3.000 | 4.250 |
| 75 | 25 | 2.250 | 1.500 | 3.125 |

Intermediate compositions may be calculated by interpolation. The values in the table are selected to produce stoichiometric mullite ($3Al_2O_3.2SiO_2$; 71.80 weight percent $Al_2O_3$ and 28.2 weight percent $SiO_2$) and are calculated from the following stoichiometric equations:

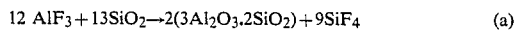
$$12 AlF_3 + 13 SiO_2 \rightarrow 2(3Al_2O_3.2SiO_2) + 9SiF_4 \quad (a)$$

and

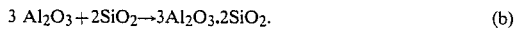
$$3 Al_2O_3 + 2SiO_2 \rightarrow 3Al_2O_3.2SiO_2. \quad (b)$$

(Note: (b) does not necessarily occur as a reaction during the process.) If exact stoichiometric amounts of $AlF_3$, $SiO_2$, and $Al_2O_3$ are used, $AlF_3$ loss by evaporation during the process could result in an excess of $SiO_2$ in mullite whiskers. To prevent this, excess of $AlF_3$ is used in the starting mixture to compensate for the $AlF_3$ which is lost. However, adding too much $AlF_3$ can result in an excess of $Al_2O_3$ in the mullite whiskers. In general, the amounts used may be adjusted to accommodate variations in $AlF_3$ loss. The object is to achieve the desired weight percentages of $Al_2O_3$ and $SiO_2$ in the mullite final product.

The starting materials for the process are anhydrous $AlF_3$, $Al_2O_3$, and fused $SiO_2$ powders which are intimately (uniformly) mixed. Commercially available $AlF_3$ (99.90%), $Al_2O_3$ (99.99%), and fused $SiO_2$ (99.50%) are preferably used. The particle size of the $Al_2O_3$ is important and is preferably less than 1 micron, more preferably 0.3 microns or less, and still more preferably 0.05 microns or less. The particle sizes of the $AlF_3$ and fused $SiO_2$ are less critical but are preferably less than 40 microns. The uniform mixtures of $AlF_3$, $Al_2O_3$, and $SiO_2$ may be formed by mixing the powders in a suitable volatile solvent such as ethanol and then drying the resulting mixture. In the examples, the mixtures were then ground with a corundum mortar and pestle and screened through a 40 micron sieve to break up large agglomerates.

The composition of the mullite whiskers of this invention are not limited to stoichiometric mullite (71.80 wt % $Al_2O_3$ and 28.20 wt % $SiO_2$). Acceptable compositions contain $Al_2O_3$ in the range of from 70.50 weight percent up to the point that the $Al_2O_3$ in stoichiometric mullite solid solution becomes saturated with $Al_2O_3$ (about 74 weight percent of $Al_2O_3$ according to the $Al_2O_3$-$SiO_2$ phase diagram of Aksay and Pask, Science, 1974, 183,69), with $SiO_2$ being the remainder. A preferred compositional range is from 71.80 weight percent $Al_2O_3$ up to the saturation point of the $Al_2O_3$ in stoichiometric mullite solid solution (about 74 weight percent $Al_2O_3$), with $SiO_2$ being the remainder of the mullite whisker composition. This preferred range contains stoichiometric mullite and the solid solution range of $Al_2O_3$ in stoichiometric mullite. The mullite whiskers of the composition in the solid solution range of $Al_2O_3$ in stoichiometric mullite will have essentially similar chemical and physical properties as stoichiometric mullite whiskers. A more preferred range of $Al_2O_3$ is from 71.80 to 73.00 weight percent, with 71.80 to 72.00 weight percent being still more preferred, the remainder of the mullite whisker composition being $SiO_2$. Most preferred is stoichiometric mullite.

As the weight percentage of $Al_2O_3$ goes below 71.80, the resulting excess of $SiO_2$ could be in the form of cristobalite. Thus, the product could be comprised of stoichiometric mullite whiskers with some cristobalite. Cristobalite undergoes a reversible phase transformation which is accompanied by substantial volume changes during thermal cycling in service. Additionally, for use in composites, it is preferable that mullite is free of cristobalite which can react with some matrix materials.

If the weight percentage of $Al_2O_3$ in the composition exceeds the saturation point of $Al_2O_3$ in stoichiometric mullite solid solution (about 74.0 weight percent $Al_2O_3$), the product will comprise of mullite whiskers and free $Al_2O_3$ which could react with a matrix material and deteriorate the properties of the composite. For this reason, the upper limit of the weight percentage of $Al_2O_3$ is about 74.0 weight percent (the saturation of the $Al_2O_3$ in stoichiometric mullite), with the remainder being $SiO_2$.

The composition of commercially available $AlF_3$ seems to vary considerably. Therefore, it is recommended that a sample of the $AlF_3$ be weighed, heated for a few hours to 600° C. and then reweighed or subjected to thermal gravametric analysis. The loss of weight should preferably be less than 3% and more preferably less than 1.5%. The amount of $AlF_3$ used should be increased to compensate for any loss measured.

The first step of the process is the production of barlike topaz crystals from the loose, intimate mixture of AlF$_3$, Al$_2$O$_3$, and fused SiO$_2$ powders. Conventional reaction temperatures and times may be used for this topaz production step. For instance, temperatures in the range of from about 700° to about 950° C. and reaction times of from about 3 to 10 hours work well.

It is critical that this topaz production step occurs under a SiF$_4$ atmosphere and anhydrous conditions. The barlike topaz crystals are produced from a uniform mixture of anhydrous AlF$_3$, Al$_2$O$_3$, and fused SiO$_2$ powders in an anhydrous SiF$_4$ atmosphere. This is accomplished by heating the AlF$_3$/Al$_2$O$_3$/SiO$_2$ powder mixture in a covered corundum crucible in a furnace. The reaction generates SiF$_4$ gas which quickly replaces the original air in the crucible. The result is that an approximately 100 percent SiF$_4$ atmosphere is present during the barlike topaz crystal formation. This barlike crystalline form of topaz is critical as a intermediate product for the mullite whisker formation step. Note again that when from more than 50 up to 75 mole percent of the Al$_2$O$_3$ in the final mullite product is originally supplied as Al$_2$O$_3$ powder, some unreacted Al$_2$O$_3$ and SiO$_2$ may be present with the barlike topaz crystals after this first step. However, at the higher (1150°-1700° C.) temperatures of the second step, this Al$_2$O$_3$ and SiO$_2$ is converted along with the barlike topaz crystals to form mullite whiskers.

In the second step, the barlike topaz crystals are decomposed to form mullite whiskers by heating in an approximately 100 percent SiF$_4$ atmosphere under anhydrous conditions at a temperature of from about 1150° C. to about 1700° C., preferably from 1250° C. to 1350° C., and most preferably at about 1250° C. About 3 to 10 hours is sufficient for the complete conversion of the barlike topaz crystals into mullite whiskers. Preferably the heating time is from 3 to 5 hours and more preferably about 4 hours.

The described process can be carried out by first firing to form barlike topaz crystals and then subsequently firing to produce the mullite whiskers. Or those two separate firings an be combined into a single firing with a hold at a temperature of from about 700° C. to about 950° C. to form barlike topaz crystals followed by a ramp to a temperature of from about 1150° C. to about 1700° C. where the mullite whiskers are formed. The one-fire process is preferable because it is more suitable for production on an industrial scale. Moreover, the process can be successfully carried out by continuously heating from room temperature up to a temperature of from about 1150° C. to about 1700° C. at a slow heating rate of from 0.5° to 2.0° C./minute without a hold at from about 700° C. to about 950° C.

The final reaction product consists of loosely agglomerated mullite whiskers which can be easily separated in a conventional, chemically inert (to mullite) volatile suspension medium such as ethanol, toluene, or cyclohexane. After the are dried, the mullite whiskers are ready for use in ceramic metal, and other composite matrices. Suitable metal matrix materials include aluminum, aluminum-based alloys, magnesium, and magnesium-based alloys. Suitable ceramic matrix materials include (1) oxide ceramics such as zircon, mullite, alumina, cordierite, chromium oxide, titanium oxide, and silica, and (2) non-oxide ceramics such as silicon carbide, silicon nitride, aluminum nitride, and boron nitride.

Again, it is critical that both the barlike topaz crystal forming step and the mullite whisker forming steps are performed under anhydrous conditions in an approximately 100 percent SiF$_4$ atmosphere. This was demonstrated for the binary AlF$_3$/SiO$_2$ process by examples and SEM photographs presented in the Talmy et al. U.S. patent application Ser. No. 07/070/757, filed on July 6, 1987, discussed above in the background of the invention, and herein incorporated by reference. We have found that the very same problems occur in tee present ternary AlF$_3$/Al$_2$O$_3$/SiO$_2$ process. The presence of water or the lack of the SiF$_4$ atmosphere will produce granular clumps of topaz which cannot be used to produce mullite whiskers. Further, without a SiF$_4$ atmosphere, barlike topaz crystals will produce prismatic mullite rather than the desired mullite whiskers.

Finally, there are a number of advantages to the present AlF$_3$/Al$_2$/SiO$_2$ ternary process over the Talmy et al. AlF$_3$/SiO$_2$ binary process. First, Al$_2$O$_3$ is less expensive and more readily available than the AlF$_3$ it replaces. Second, by varying the Al$_2$O$_3$:AlF$_3$ ratio, the size of the mullite whiskers can be modified. This is not possible in the AlF$_3$/SiO$_2$ process The general nature of the invention having been set forth, the following examples are presented as specific illustrations thereof. It will be understood that the invention is not limited to these specific examples but is susceptible to various modifications that will be recognized by one of ordinary skill in the art.

EXAMPLES 1A through 1D

The starting materials for examples 1A through 1D are listed in table 2.

TABLE 2

| EXAMPLE | % AlF$_3$ replaced with Al$_2$O$_3$ | Starting mixture in grams | | | TOTAL WEIGHT | Amount in crucible (grams) | Figure (Product) |
|---|---|---|---|---|---|---|---|
| | | AlF$_3$[1] | Al$_2$O$_3$[2] | SiO$_2$[3] | | | |
| 1A | 0 | 118.27 | 0 | 84.63 | 202.90 | 0.54 | 1A |
| 1B | 25 | 44.36 | 8.97 | 35.26 | 88.59 | 0.63 | 1B |
| 1C | 50 | 29.57 | 17.95 | 28.21 | 75.73 | 0.83 | 1C |
| 1D | 75 | 14.79 | 26.92 | 21.16 | 62.87 | 1.34 | 1D |

[1]AlF$_3$, 99.9%, from Atomergic Chemetals
[2]Al$_2$O$_3$, 0.3 micron, from Fisher Scientific
[3]Fused SiO$_2$, 99.5+%, 4.3 micron average, from Thermo Materials For each example a starting mixture was prepared by mixing AlF$_3$, Al$_2$O$_3$, and SiO$_2$ powders in the amounts listed in table 2. These powders were thoroughly mixed in ethanol and dried in a vacuum oven at 55 to 60° C. The resulting starting mixtures were ground with a corundum mortar and pestle and screened through a 40 micron sieve. Amounts of the various starting mixtures as listed in table 2 were then placed into 18 ml corundum crucibles and covered with corundum discs. The amounts of the starting mixtures used were adjusted to ensure about equal amounts of SiF$_4$ in the examples. The covered crucibles were heated in a furnace with a ramp of 8.6° C./min to 800° C. and held at that temperature for 3 hours for topaz formation. The temperature was then ramped to 1250° C. at 1.5° C./min and held there for 4 hours for mullite formation. The specimens were allowed to cool naturally in the furnace and removed at room temperature. X-ray diffraction and scanning electron microscope (SEM) photographs show the products to consist of needlelike mullite whiskers. FIGS 1A, 1B, 1C, and 1D are SEM photographs showing the size of the mullite whiskers produced when (A) 0, (B) 25, (C) 50, and (D) 75 percent of the AlF$_3$ is replaced with Al$_2$O$_3$. (Note that the holes appearing in FIGS. 1A, 1B, and 1C were part of a substrate the mullite whiskers were resting on.)

EXAMPLE 2A through 2D

In examples 2A through 2D starting mixtures were made using the following proportions in each case: 11.83g AlF$_3$, 7.18g Al$_2$O$_3$, and 11.28 g fused SiO$_2$. In these mixtures 50% of the AlF$_3$ is replaced with Al$_2$O$_3$. In each of the examples the particle size was varied as shown in Table 3.

TABLE 3

| EXAMPLE | Al$_2$O$_3$ Particle Size (microns) | FIGURE (Product) |
| --- | --- | --- |
| 2A | 0.05 | 2A |
| 2B | 0.3 | 2B |
| 2C | 45 and less (−325 mesh) | 2C |
| 2D | 150 and less (−100 mesh) | 2D |

For each of the examples the AlF$_3$, Al$_2$O$_3$, and fused SiO$_2$ powders were thoroughly mixed in ethanol and dried in a vacuum oven at 55° to 60° C. The resulting starting mixtures were ground with a corundum mortar and pestle and screened through a 40 micron sieve. Two grams of each mixture were placed in separate 18 ml corundum crucibles and covered with corundum discs. The covered crucibles were heated in a furnace using the same procedure as for examples 1A through 1D above. FIGS. 2A, 2B, 2C, and 2D are SEM photographs of the mullite whisker products when the Al$_2$O$_3$ starting material has a particle size of (A) 0.05 microns, (B) 1 0.3 micron, (C) 45 microns and less, and (D) 150 microns and less.

Obviously, numerous modifications and variations of th present invention are possible in light of the above teachings. It is therefore to be understood that within the scope of the appended claims the invention may be practiced otherwise than as specifically described herein.

What is claimed as new and desired to be secured by Letters Patent of the Unite States is:

1. A process for forming mullite whiskers comprising the following steps in order:
   (1) forming a loose uniform mixture of anhydrous AlF$_3$, Al$_2$O$_3$, and fused SiO$_2$ powders in amounts selected to produce mullite whiskers containing Al$_2$O$_3$ in an amount of from 70.50 weight percent up to the amount that produces a saturated solution of Al$_2$O$_3$ in stoichiometric mullite, with SiO$_2$ comprising the remainder of the mullite, wherein from more than zero to 75 percent of the Al$_2$O$_3$ in the mullite is supplied by the Al$_2$O$_3$ powder with the remainder being supplied by the AlF$_3$ powder;
   (2) heating the mixture in an anhydrous SiF$_4$ atmosphere at a temperature of from about 700° C. to about 950° C. until the AlF$_3$, SiO$_2$, and Al$_2$O$_3$ react to form barlike topaz crystals; and
   (3) heating the barlike topaz crystals in an anhydrous SiF$_4$ atmosphere at a temperature of from about 1150° C. to about 1700° C. until the barlike topaz crystals are converted to mullite whiskers.

2. The process of claim 1 wherein the AlF$_3$, Al$_2$O$_3$, and fused SiO$_2$ powders are used in amounts selected to produce mullite whiskers containing Al$_2$O$_3$ in an amount of from 71.80 weight percent up to the weight percent that produces a saturated solution of Al$_2$O$_3$ in stoichiometric mullite, with SiO$_2$ comprising the remainder of the mullite whisker composition.

3. The process of claim 2 wherein the AlF$_3$, Al$_2$O$_3$, and fused SiO$_2$ powders are used in amounts selected to produce mullite whiskers containing from 71.80 to 73.00 weight percent Al$_2$O$_3$ with SiO$_2$ being tee remainder.

4. The process of claim 3 wherein the AlF$_3$, Al$_2$O$_3$, and fused SiO$_2$ powders are used in amounts selected to produce mullite whiskers containing from 71.80 to 72.00 weight percent Al$_2$O$_3$ with SiO$_2$ being the remainder.

5. The process of claim44 wherein AlF$_3$, and fused SiO$_2$ powders are used in amounts selected to produce stoichiometric mullite whiskers.

6. A process for forming barlike crystalline topaz comprising the following steps in order:
   (1) forming a loose uniform mixture of anhydrous AlF$_3$, Al$_2$O$_3$, and fused SiO$_2$ powders in amounts selected to produce topaz which will produce mullite containing Al$_2$O$_3$ in an amount of from 70.50 weight percent up to the amount that produces a saturated solution of Al$_2$O$_3$ in stoichiometric mullite, with SiO$_2$ comprising the remainder of the mullite,, wherein from more than zero to 75 percent of the aluminum in the topaz is supplied by the Al$_2$O$_3$ powder with the remainder being supplied by the AlF$_3$ powder; and
   (2) heating the mixture in an anhydrous SiF$_4$ atmosphere at a temperature of from 700° C. to about 950° C. until the AlF$_3$, SiO$_2$, and Al$_2$O$_3$ react to for barlike topaz crystals.

7. The process of claim 6 wherein from more than zero to 50 percent of the aluminum in the topaz is supplied by the Al$_2$O$_3$ powder with the remainder being supplied by the AlF$_3$ powder.

8. The process of claim 6 wherein the AlF$_3$, Al$_2$O$_3$, and fused SiO$_2$ powders are used in amounts selected to produce barlike topaz crystals which will produce mullite containing Al$_2$O$_3$ in an amount of from 71.80 weight percent up to the amount that produces a saturated solution of Al$_2$O$_3$ in stoichiometric mullite with SiO$_2$ comprising the remainder of the mullite.

9. The process of claim 8 wherein the AlF$_3$, Al$_2$O$_3$, and fused SiO$_2$ powders are used in amounts selected to produce barlike topaz crystals which will produce mullite containing from 71.80 to 73.00 weight percent Al$_2$O$_3$ with SiO$_2$ being the remainder.

10. The process of claim 9 wherein the AlF$_3$, Al$_2$O$_3$, and fused SiO$_2$ powders used in amounts selected to produce barlike topaz crystals which will produce mullite containing from 71.80 to 72.00 weight percent of Al$_2$O$_3$ with SiO$_2$ being the remainder.

11. The process of claim 10 wherein the AlF$_3$, Al$_2$O$_3$, and fused SiO$_2$ powders are used in amounts selected to produce barlike topaz crystals which will produce stoichiometric mullite.

12. The process of claim 11 wherein from more than zero to 50 percent of the aluminum in the topaz is supplied by the Al$_2$O$_3$ powder with the remainder being supplied by the AlF$_3$ powder.

* * * * *